United States Patent [19]
Reiher et al.

[11] Patent Number: 5,972,048
[45] Date of Patent: Oct. 26, 1999

[54] FIBER-REACTIVE TRIPHENDIOXAZINE DYES, PREPARATION THEREOF AND USE THEREOF

[75] Inventors: Uwe Reiher, Hofheim; Hans-Walter Stein, Steinau a.d. Str.-Marjoss, both of Germany

[73] Assignee: DyStar Textilfarben GmbH & Co. Deutschland KG, Frankfurt, Germany

[21] Appl. No.: 09/085,308

[22] Filed: May 27, 1998

[30] Foreign Application Priority Data

May 28, 1997 [DE] Germany ............. 197 22 337

[51] Int. Cl.$^6$ ................... C07D 498/04
[52] U.S. Cl. ............ 8/567; 8/436; 8/543; 8/549; 544/76
[58] Field of Search ................ 544/76; 8/436, 8/543, 549, 567

[56] References Cited

U.S. PATENT DOCUMENTS 5,772,698  6/1998  Reichert et al. ............. 8/549

FOREIGN PATENT DOCUMENTS

| 0 070 807 | 1/1983 | European Pat. Off. . |
| 0 101 665 | 2/1984 | European Pat. Off. . |
| 0 158 857 | 10/1985 | European Pat. Off. . |
| 0 501 252 | 9/1992 | European Pat. Off. . |
| 0 739 950 | 10/1996 | European Pat. Off. . |
| 2 297 232 | 6/1976 | France . |
| 1 477 071 | 6/1977 | United Kingdom . |

OTHER PUBLICATIONS

*Chemical Abstracts*, vol. 105: 25819y (1986).

*Primary Examiner*—Richard L. Raymond

[57] ABSTRACT

Fiber-reactive triphendioxazine dyes, preparation thereof and use thereof Novel triphenoxazine dyes of the formula (1)

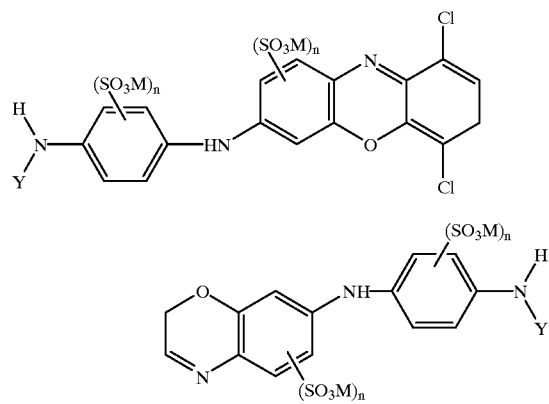

where M is hydrogen or an alkali metal, m and n are each 1 or 2 and Y is 2,4,6-trifluoropyrimidinyl or a radical of the formula (3)

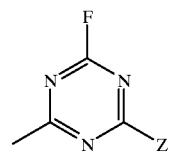

where Z is fluorine, —$NH_2$, $C_1$–$C_4$-alkylamino which may be hydroxy- or sulfo-substituted, N,N-di($C_1$–$C_4$-alkyl) amino which may be hydroxy- or sulfo-substituted, phenylamino which may be $C_1$–$C_4$-alkyl-, $C_1$–$C_4$-alkoxy-, halogen-, hydroxy-, ureido-, acetylamino-, carboxy-, sulfo- or sulfomethyl-substituted, N-($C_1$–$C_4$-alkyl)-N-phenylamino, sulfonaphthylamino, cyanoamino or N-morpholino, are notable for high color strengths, high brilliance and high fastnesses.

10 Claims, No Drawings

FIBER-REACTIVE TRIPHENDIOXAZINE DYES, PREPARATION THEREOF AND USE THEREOF

DESCRIPTION

Fiber-reactive triphendioxazine dyes, preparation thereof and use thereof

Numerous high color strength products have been described in the patent literature (e.g., EP-A-0 070 807, EP-A-0 101 665, EP-A-0 501 252) in the field of triphendioxazine reactive dyes. However, these products have the disadvantage that their synthesis is frequently insufficiently selective, i.e., too many by-products are formed at times. The resulting dyeings usually lack brilliance. There is therefore a need for triphendioxazine dyes which have high color strengths, high brilliance and high fastnesses and which are very selective to synthesize.

The present invention now provides novel fiber-reactive triphendioxazine dyes of the below indicated and defined general formula (1), whose synthesis is highly selective and whose dyeings are remarkably brilliant.

In the formula (1):

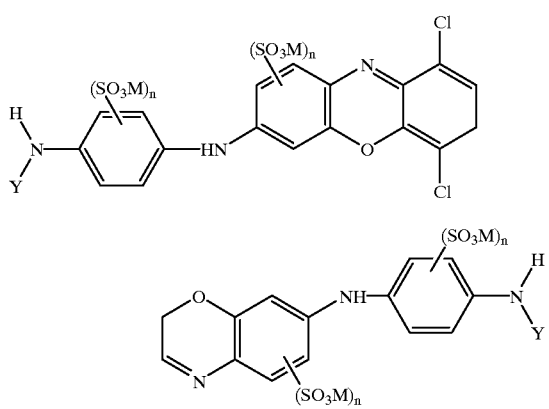

M is hydrogen or an alkali metal, such as sodium, potassium or lithium;
m is 1 or 2;
n is 1 or 2;
Y is a group of the formula (2)

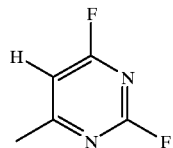

or a group of the general formula (3)

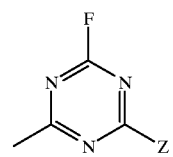

where
Z is fluorine, amino, $C_1$–$C_4$-alkylamino which may be hydroxy- or sulfo-substituted, N,N-di($C_1$–$C_4$-alkyl)amino whose alkyl radicals may be hydroxy- or sulfo-substituted, phenylamino which may be $C_1$–$C_4$-alkyl-, $C_1$–$C_4$-alkoxy-, halogen-, e.g., fluorine-, chlorine- or bromine-, hydroxy-, ureido-, acetylamino-, carboxy-, sulfo- or sulfomethyl-substituted, N-($C_1$–$C_4$-alkyl)-N-phenylamino, sulfonaphthylamino, cyanoamino or N-morpholino.

Preferred radicals Z for the purposes of the present invention are fluorine, amino, methylamino, ethylamino, propylamino, butylamino, diethylamino, 2-sulfoethylamino, N-methyl-2-sulfoethylamino, bis(2-hydroxyethyl)amino, 2-hydroxyethylamino, 3-hydroxypropylamino, 4-hydroxybutylamino, phenylamino, 2-sulfophenylamino, 3-sulfophenylamino, 4-sulfophenylamino, 2,4-disulfophenylamino, 4-carboxyphenylamino, 4-carboxy-2-hydroxyphenylamino, 2-methylphenyl-amino, 3-methylphenylamino, 4-methylphenylamino, N-methyl-phenylamino, 2-methoxyphenylamino, 3-methoxyphenylamino, 4-methoxyphenylamino, 4-acetylaminophenylamino, 3-acetylaminophenylamino, 3-ureidophenyl-amino, 4-ureidophenylamino, cyanamino or N-morpholino.

The present invention further provides processes for preparing compounds of the general formula (1), which comprise reacting a compound of the formula (4)

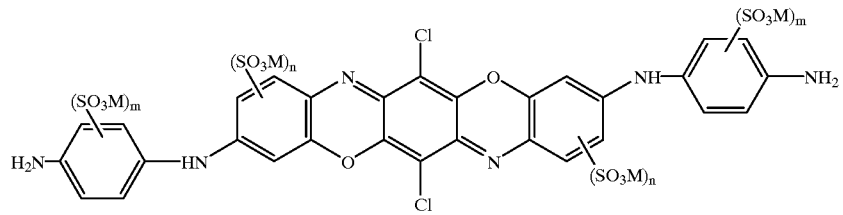

where M, m and n are each as defined above, with a compound of the formula (5)

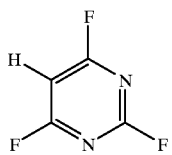

(5)

or with a compound of the general formula (6)

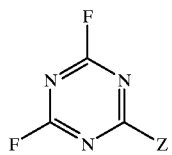

(6)

where Z is as defined above, or reacting a compound of the general formula (7)

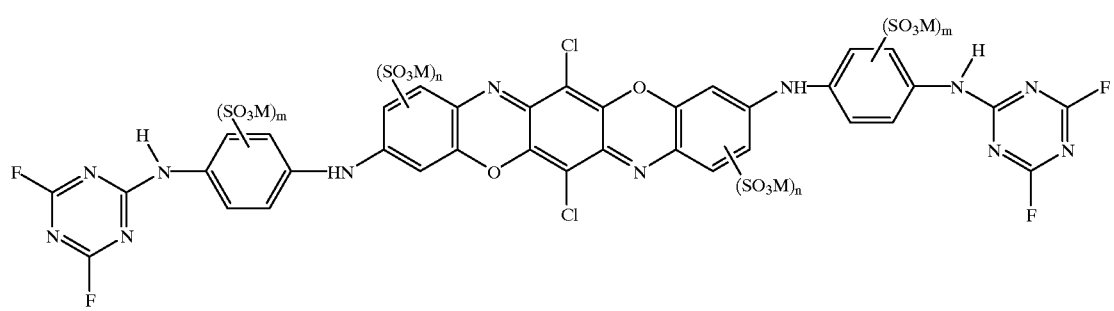

(7)

where M, n and m are each as defined above, with a compound of the general formula H–Z where Z is as defined above.

The reactions mentioned are carried out in suspension or solution in an aqueous or aqueous organic medium. If the reaction is carried out in an aqueous organic medium, the organic medium is acetone, dimethylformamide, dimethyl sulfoxide or N-methylpyrrolidone, for example. The hydrogen fluoride detached in the course of the condensation is advantageously neutralized continuously by addition of aqueous alkali metal hydroxides, carbonates or bicarbonates.

The reaction of the triphendioxazine of the general formula (4) with 2,4,6-trifluoropyrimidine of the formula (5) is generally carried out at a temperature between 10° C. and 60° C., preferably at a temperature between 30° C. and 40° C., at a pH between 4 and 7, preferably between 5 and 6, and advantageously in a molar ratio of 1:2 to 1:4, especially of 1:2 to 1:2.2

The reaction of the triphendioxazine of the general formula (4) with the fluoro-s-triazine of the general formula (6) is generally carried out at a temperature between −5° C. and +90° C., preferably at a temperature between −3° C. and +25° C., at a pH between 6 and 8, and advantageously in a molar ratio of 1:2 to 1:4, especially of 1:2 to 1:2.3.

The reaction of the triphendioxazine of the general formula (7) with a compound of the general formula H–Z is carried out a temperature between −5° C. and +50° C., preferably at a temperature between −3° C. and +25° C., at a pH between 6 and 8, advantageously in a molar ratio of 1:2 to 1:3, especially 1:2 to 1:2.1.

The compounds of the general formula (7) are synthesized by reacting a triphendioxazine compound of the general formula (4) with cyanuric fluoride, preferably at a temperature between −5° C. and +30° C., especially between −3° C. and +5° C., at a pH between 2 and 9, advantageously in a molar ratio of 1:2 to 1:3, especially 1:2 to 1:2.2. This reaction is likewise carried out in an aqueous or aqueous organic medium.

The triphendioxazine compound of the general formula (4) is known in the patent literature. Its synthesis is described in DE-A-2 302 382, for example.

The separation and isolation of the compounds of the general formula (1) of the invention from the synthesis batches is effected by generally known methods either by precipitating from the reaction medium by means of electrolytes, for example sodium chloride or potassium chloride, or by evaporating the reaction solution, for example by spray drying, in which case this reaction solution may have a buffer substance added to it.

The compounds of the formula (1) according to the invention have fiber-reactive properties and very good dye properties. They can therefore be used for dyeing and printing hydroxy- and/or carboxamido-containing material, especially fiber material. They can also be used for dyeing in the form of the as-synthesized solutions directly as liquid brands, if desired after addition of a buffer substance and if desired after concentrating.

The present invention therefore also provides for the use of the compounds of the formula (1) for dyeing hydroxy- and/or carboxamido-containing materials, i.e., for processes for dyeing such materials by applying the compound of the formula (1) to the material or introducing it into the material and fixing it on or in the material by means of heat or with the aid of an alkaline agent or by means of both measures. Dyeing as used herein encompasses solution dyeing, for example polyamide films, and printing. The materials are preferably dyed in the form of fiber materials, especially in the form of textile fibers, as in the form of fabrics and yarns, for example in the form of hanks and wound packages.

Hydroxy-containing materials are natural or synthetic hydroxy-containing materials, for example cellulose fiber materials or their regenerated products and polyvinyl alcohols. Cellulose fiber materials are preferably cotton, but also other vegetable fibers, such as linen, hemp, jute and ramie fibers; examples of regenerated cellulose fibers are staple viscose and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The compounds of the formula (1) can be applied to and fixed on the substrates mentioned, in particular the fiber materials mentioned, by the techniques known for water-soluble dyes, especially for fiber-reactive dyes. For instance, on cellulose fibers they produce from a long liquor by the exhaust method and by means of various acid-binding agents with or without neutral salts, such as sodium chloride or sodium sulfate, dyeings having very good color yields and also excellent color build-up combined with high degrees of fixation. They are dyed at temperatures between 40 and 105° C., if desired at temperatures up to 120° C. under superatmospheric pressure, and if desired in the presence in the aqueous bath of customary dyeing auxiliaries. One possible procedure is to introduce the material into the warm bath and to gradually heat the bath to the desired dyeing temperature and to complete the dyeing process at that temperature. The neutral salts which speed up the exhaustion of the compounds of the formula (1) can if desired not be added to the bath until after the actual dyeing temperature has been reached.

The padding process likewise produces dyeings having excellent color yield with high degree of fixation and very good color build-up on cellulose fibers, on which fixing can be effected by batching at room temperature or elevated temperature, for example at up to about 60° C., by steaming or with dry heat in a conventional manner.

Similarly, the customary printing processes for cellulose fibers, which can be carried out either single-phase, for example by printing with a print paste comprising sodium carbonate or some other acid-binding agent as well as the compound of the formula (1) and by subsequent steaming at 100 to 103° C., or two-phase, for example by printing with a neutral or weakly acid print paste comprising the colorant and subsequent fixation either by passing the printed material through a hot electrolyte-comprising alkaline bath or by overpadding with an alkaline electrolyte-comprising padding liquor with a subsequent batching of this treated material or subsequent steaming or subsequent treatment with dry heat, produce strong prints with well-defined contours. The appearance of the prints is not greatly affected by variations in the fixing conditions. Not only in dyeing but also in printing, the degrees of fixation obtained with the compounds of the formula (1) are very high.

When fixing by means of dry heat in accordance with the customary thermofix processes, hot air from 120 to 220° C. is used. In addition to the customary steam at 101 to 103° C. it is also possible to use superheated steam and high-pressure steam at temperatures of up to 160° C.

The acid-binding agents which effect the fixation of the compounds of the formula (1) on the cellulose fibers include for example water-soluble basic salts of the alkali metals and the alkaline earth metals of inorganic or organic acids and also compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass or trisodium phosphate.

By treating the compounds of the formula (1) with the acid-binding agents, with or without heating, these compounds become chemically attached to the cellulose fibers; especially the dyeings on cellulose have, after the customary aftertreatment by rinsing to remove unfixed portions of the compounds of the formula (1), excellent weffastnesses, in particular since such unfixed portions are easily washed off on account of their good solubility in cold water.

The dyeings on polyurethane and polyamide fibers are customarily carried out from an acid medium. For instance, the dyebath may have added to it acetic acid and/or ammonium sulfate and/or acetic acid and ammonium acetate or sodium acetate in order to bring it to the desired pH. To achieve a usable levelness for the dyeing, it is advisable to add customary leveling aids, for example based on a reaction product of cyanuric chloride with three times the molar amount of an aminobenzenesulfonic acid and/or an aminonaphthalenesulfonic acid and/or based on a reaction product of for example stearylamine with ethylene oxide. Generally the material to be dyed is introduced into the bath at a temperature of about 40° C., agitated in the bath for some time, the dyebath is then adjusted to the desired weakly acid, preferably weakly acetic acid, pH, and the actual dyeing is carried out at a temperature between 60 and 98° C. However, the dyeings can also be carried out at boiling point or at temperatures of up to 120° C. (under superatmospheric pressure).

The dyeings and prints prepared with the compounds of the formula (1) are notable for bright hues. Especially the dyeings and prints on cellulose fiber material have, as mentioned, in addition high color strength, good lightfastness and very good weffastnesses, such as wash, milling, water, cross dyeing and perspiration fastness properties, also good fastness to pleating, hotpressing and rubbing.

Of particular note are the high degrees of fixation achievable with the dyes of the invention on cellulose fiber materials, which can be above 90% in the case of printing processes and pad-dyeing processes. A further advantage of the compounds of the formula (1) is the ease of washing of the portions which have not become fixed during printing or dyeing, as a result of which the washing of the printed or dyed cellulose fiber materials can be accomplished with low quantities of wash liquor with or without an energy-saving temperature profile during the washing process.

In the Examples which follow, parts and percentages are by weight, unless otherwise stated. Parts by weight relate to parts by volume as the kilogram relates to the liter.

The compounds described in the Examples in terms of a formula are indicated in the form of the free acid; generally they are prepared and isolated in the form of their alkali metal salts, such as lithium, sodium or potassium salts, and used for dyeing in the form of their salts. The starting compounds and components mentioned in the form of the free acid in the following Examples, can similarly be used in the synthesis as such or in the form of their salts, preferably alkali metal salts.

The absorption maxima ($\lambda_{max}$) in the visible region reported for the dyes of the invention were determined on aqueous solutions of their alkali metal salts.

EXAMPLE 1

A pH 6.8 solution of 28.4 parts of disodium hydrogenphosphate and 88.7 parts of the triphendioxazine compound of the formula

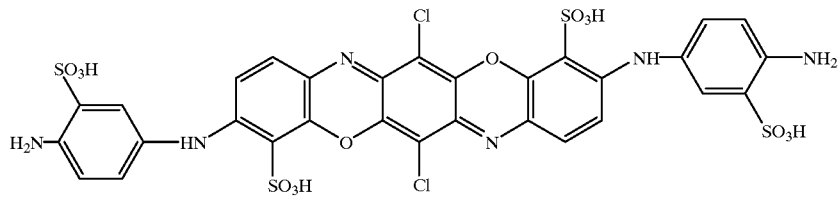

in 700 parts of water is admixed with 29.7 parts of cyanuric fluoride at 0° C. and the batch is subsequently stirred at 0° C. to 3° C. at pH 6.8 for about 10 minutes. 19.2 parts of morpholine are then added, and the batch is warmed to 20° C. to 25° C. for 4 hours while the pH is maintained at 6.5 with sodium carbonate. Sodium chloride is added to salt out the dye. Written in the form of the free acid, the dye has the formula

EXAMPLE 2

A pH 6.5 solution of 44.2 parts of 2,5-disulfoaniline and 8.4 parts of sodium fluoride in 600 parts of water is admixed with 29.7 parts of cyanuric fluoride at 0° C. by stirring, the batch is subsequently stirred at pH 6.8 for a further 10 minutes or so, and 88.7 parts of the triphendioxazine compound mentioned in Example 1 are added. The batch is then allowed to warm to 20° C. to 25° C. over 4 hours while the

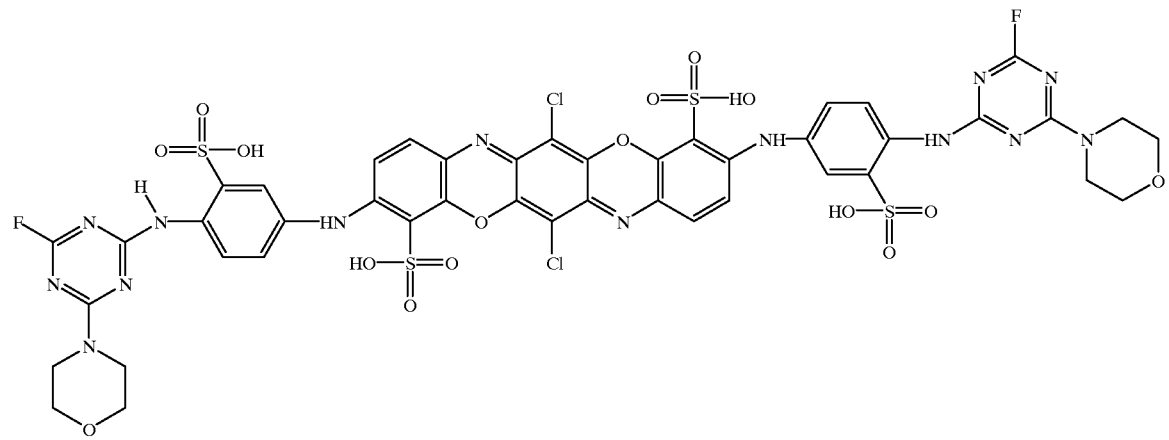

(λ-max = 602 nm)

and on application to the materials mentioned in the description, especially cellulose fiber materials, for example cotton, by the dyeing and printing processes customary for fiber-reactive dyes affords strong blue dyeings and prints having good fastness properties, of which good lightfastness may be specially mentioned.

pH is maintained at 6.8 with sodium carbonate. Potassium chloride is added to salt out the dye. Written in the form of the free acid, it has the formula

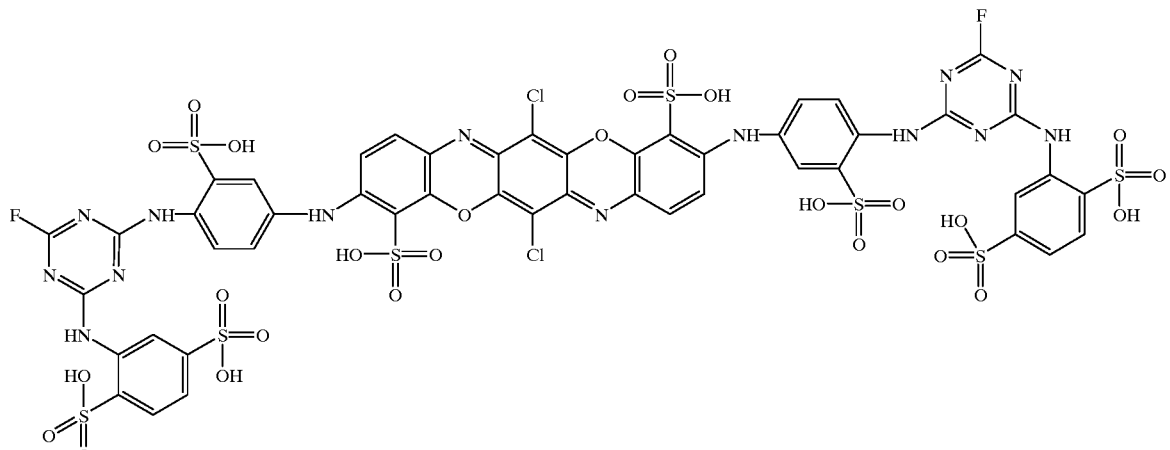

(λ_max = 595 nm)

and on application to the materials mentioned in the description, especially cellulose fiber materials, for example cotton, by the dyeing and printing processes customary for fiber-reactive dyes affords strong blue dyeings and prints having good fastness properties, of which good lightfastness may be specially mentioned.

EXAMPLE 3

A solution in 700 parts of water of 88.7 parts of the triphendioxazine starting compound mentioned in Example 1 is adjusted to pH 5.3 to 5.5 by means of sodium carbonate and heated to 40° C. 29.5 parts of 2,4,6-trifluoropyrimidine are added dropwise over 30 minutes during which the pH is maintained at 5.3 to 5.5 with the aid of sodium carbonate.

The batch is subsequently stirred at 40° C. for 4 hours before being cooled down to room temperature, and the product is isolated by salting out with sodium chloride. Written in the form of the free acid, it has the formula and on application to the materials mentioned in the description, especially cellulose fiber materials, for example cotton, by the dyeing and printing processes customary for fiber-reactive dyes affords strong blue dyeings and prints having good fastness properties, of which good lightfastness may be specially mentioned.

EXAMPLES 4 TO 34

The Table Examples which follow describe further triphendioxazine reactive dyes conforming to the general formula (8) in terms of their components. They can be prepared similarly to Examples 1 and 2 according to the invention. They have very good dye properties and dye the materials mentioned in the description, especially cellulose fiber materials, in the hue reported in the particular table example (for cotton) in high color strength and good fastnesses.

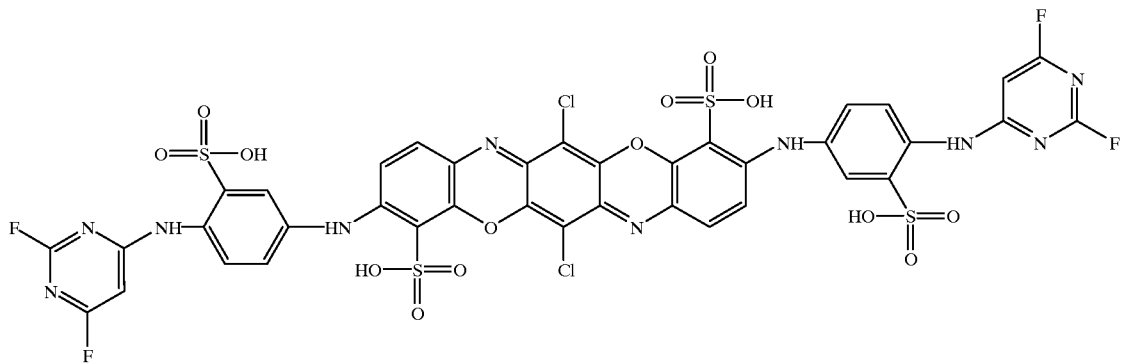

(λ_max = 626 nm)

60

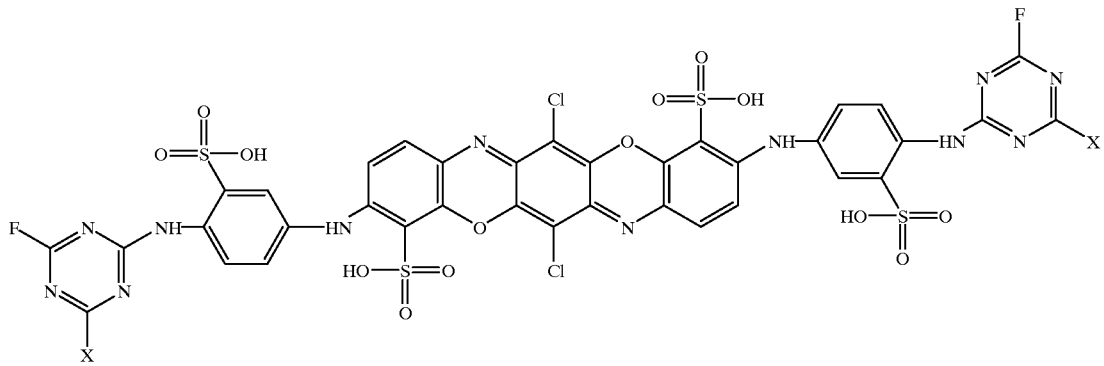

(8)

| No. | X | Hue |
|---|---|---|
| 4 | Amino | blue (605 nm) |
| 5 | Methylamino | blue (603 nm) |
| 6 | Ethylamino | blue (599 nm) |
| 7 | Propylamino | blue |
| 8 | Butylamino | blue |
| 9 | Diethylamino | blue |
| 10 | 2-Sulfoethylamino | blue (621 nm) |
| 11 | N-Methyl-2-sulfoethylamino | blue (629 nm) |
| 12 | Bis(2-hydroxyethyl)amino | blue (615 nm) |
| 13 | 2-Hydroxyethylamino | blue (604 nm) |
| 14 | 3-Hydroxypropylamino | blue |
| 15 | 4-Hydroxybutylamino | blue |
| 16 | Phenylamino | blue (601 nm) |
| 17 | 2-Sulfophenylamino | blue (597 nm) |
| 18 | 3-Sulfophenylamino | blue |
| 19 | 4-Sulfophenylamino | blue (594 nm) |
| 20 | 2,4-Disulfophenylamino | blue |
| 21 | 4-Carboxyphenylamino | blue |
| 22 | 4-Carboxy-2-hydroxyphenylamino | blue |
| 23 | 2-Methylphenylamino | blue (606 nm) |
| 24 | 3-Methylphenylamino | blue |
| 25 | 4-Methylaminophenylamino | blue |
| 26 | N-Methylphenylamino | blue (624 nm) |
| 27 | 2-Methoxyphenylamino | blue (598 nm) |
| 28 | 3-Methoxyphenylamino | blue |
| 29 | 4-Methoxyphenylamino | blue |
| 30 | 4-Acetylaminophenylamino | blue (605 nm) |
| 31 | 3-Acetylaminophenylamino | blue (610 nm) |
| 32 | 3-Ureidophenylamino | blue (608 nm) |
| 33 | 4-Ureidophenylamino | blue |
| 34 | Cyanamino | blue (631 nm) |

What is claimed is:

1. A compound of the general formula (1)

(1)

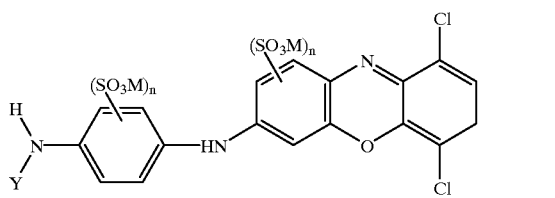

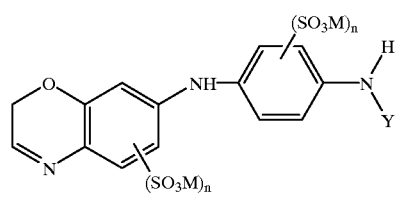

M is hydrogen or an alkali metal;
m is 1 or 2;
n is 1 or 2;
Y is a group of the formula (2)

(2)

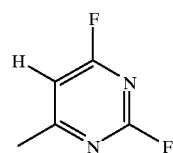

2. A method for dyeing a hydroxy- and/or carboxamido-containing material, comprising the step of dyeing said material with a compound of formula (1) of claim 1.

3. A method as claimed in claim 2, wherein the dyeing is carried out by applying the compound of formula (1) to said material or introducing it into the material and fixing the compound on the material.

4. A method as claimed in claim 2, wherein said material comprises textile fibers.

5. The method as claimed in claim 2, wherein said material comprises a polyamide film.

6. A method as claimed in claim 2, wherein said material is a cellulose fiber, a polyvinyl alcohol fiber, a polyamide fiber, or a polyurethane fiber.

7. A method as claimed in claim 2, wherein the compound of formula (1) is printed onto the said material, by printing with a print paste comprising the compound of formula (1).

8. A dye liquor or bath comprising a compound of formula (1) of claim 1.

9. A print paste comprising a compound of formula (1) of claim 1.

10. A hydroxy- and/or carboxamido-containing material which has been dyed with a compound of formula (1) of claim 1.

\* \* \* \* \*

UNITED STATES PATENT AND TRADEMARK OFFICE
CERTIFICATE OF CORRECTION

PATENT NO. : 5,972,048
DATED : October 26, 1999
INVENTOR(S) : Uwe Reiher, et. al.

It is certified that error appears in the above-indentified patent and that said Letters Patent is hereby corrected as shown below:

In the abstract, on the cover page, please delete the formula and insert the following formula (1):

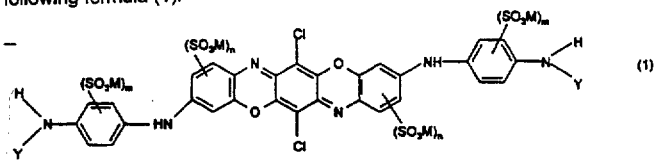

In column 1, lines 29 to 45, please delete the formula and insert the following formula (1):

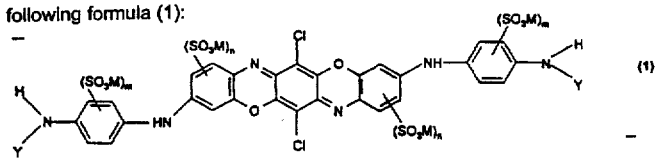

In claim 1, column 11, lines 50-66; please delete the formula and insert the following formula (1):

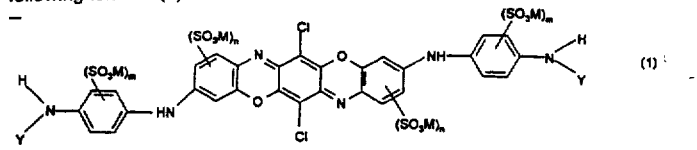

Signed and Sealed this

First Day of May, 2001

Attest:

NICHOLAS P. GODICI

Attesting Officer

Acting Director of the United States Patent and Trademark Office